US008208471B2

United States Patent
Euscher et al.

(10) Patent No.: US 8,208,471 B2
(45) Date of Patent: Jun. 26, 2012

(54) APPARATUS AND METHOD FOR RELEASING LOCAL DATA CONTENTS FOR IP-BASED DATA ACCESS, ASSOCIATED COMMUNICATION SYSTEM, DIGITAL STORAGE MEDIUM, COMPUTER PROGRAM PRODUCT AND COMPUTER PROGRAM

(75) Inventors: Christoph Euscher, Rhede (DE); Werner Goertz, Dorsten (DE); Andreas Winkler, Mönchengladbach (DE); Olaf Bigalke, Iserlohn (DE); Frank Exeler, Rheine (DE)

(73) Assignee: Gigaset Communications, GmbH, Bocholt (DE)

( * ) Notice: Subject to any disclaimer, the term of this patent is extended or adjusted under 35 U.S.C. 154(b) by 255 days.

(21) Appl. No.: 12/605,922

(22) Filed: Oct. 26, 2009

(65) Prior Publication Data

US 2010/0142394 A1    Jun. 10, 2010

(30) Foreign Application Priority Data

Oct. 27, 2008  (DE) .......................... 10 2008 053 354

(51) Int. Cl.
*H04L 12/28* (2006.01)
*H04L 9/32* (2006.01)
(52) U.S. Cl. ..................... 370/392; 370/401; 713/168
(58) Field of Classification Search .............. 370/352, 370/392, 401; 713/168, 171
See application file for complete search history.

(56) References Cited

U.S. PATENT DOCUMENTS

| 6,965,992 | B1 | 11/2005 | Joseph et al. | |
|---|---|---|---|---|
| 2004/0162787 | A1 | 8/2004 | Madison et al. | |
| 2007/0157309 | A1* | 7/2007 | Bin et al. | 726/15 |
| 2007/0206552 | A1* | 9/2007 | Yaqub et al. | 370/338 |
| 2008/0117844 | A1* | 5/2008 | Thubert et al. | 370/310 |
| 2008/0276297 | A1* | 11/2008 | Shay | 726/1 |
| 2009/0028141 | A1* | 1/2009 | Vu Duong et al. | 370/389 |
| 2010/0002686 | A1* | 1/2010 | Rosenberg et al. | 370/352 |
| 2010/0023609 | A1* | 1/2010 | Vangala et al. | 709/221 |
| 2010/0217990 | A1* | 8/2010 | Abe et al. | 713/176 |

FOREIGN PATENT DOCUMENTS

DE   102004013100   10/2005
EP   1855440        11/2007

* cited by examiner

*Primary Examiner* — Andrew Lee
(74) *Attorney, Agent, or Firm* — Kauth, Pomeroy, Peck & Bailey LLP

(57) ABSTRACT

The present invention relates to an apparatus and method for releasing local data contents for an IP-based data access, wherein an evaluation unit (2) evaluates a first IP connection (IP-V1) and extracts an IP destination address (IP:B) and an authorisation verification generating unit (3) generates an authorisation verification (BN) for the data access to the local storage unit (3). An authorisation message generating unit (4) generates an authorisation message on the basis of the authorisation verification (BN) and the extracted IP destination address (IP:B). A trigger unit (5) triggers a transmission process of the generated authorisation message over a second IP connection (IP-V2) which is different from the first IP connection (IP-V1).

11 Claims, 4 Drawing Sheets

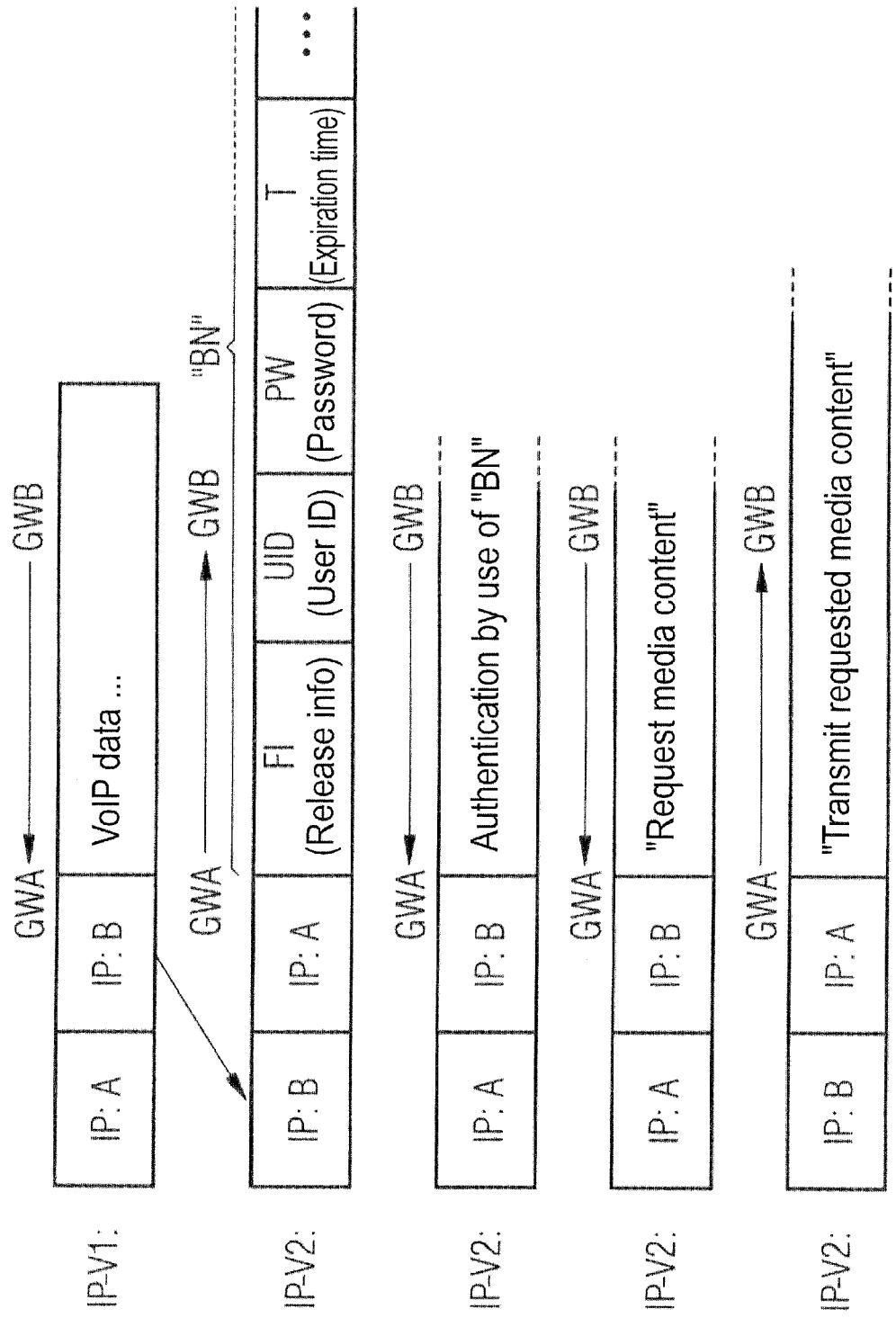

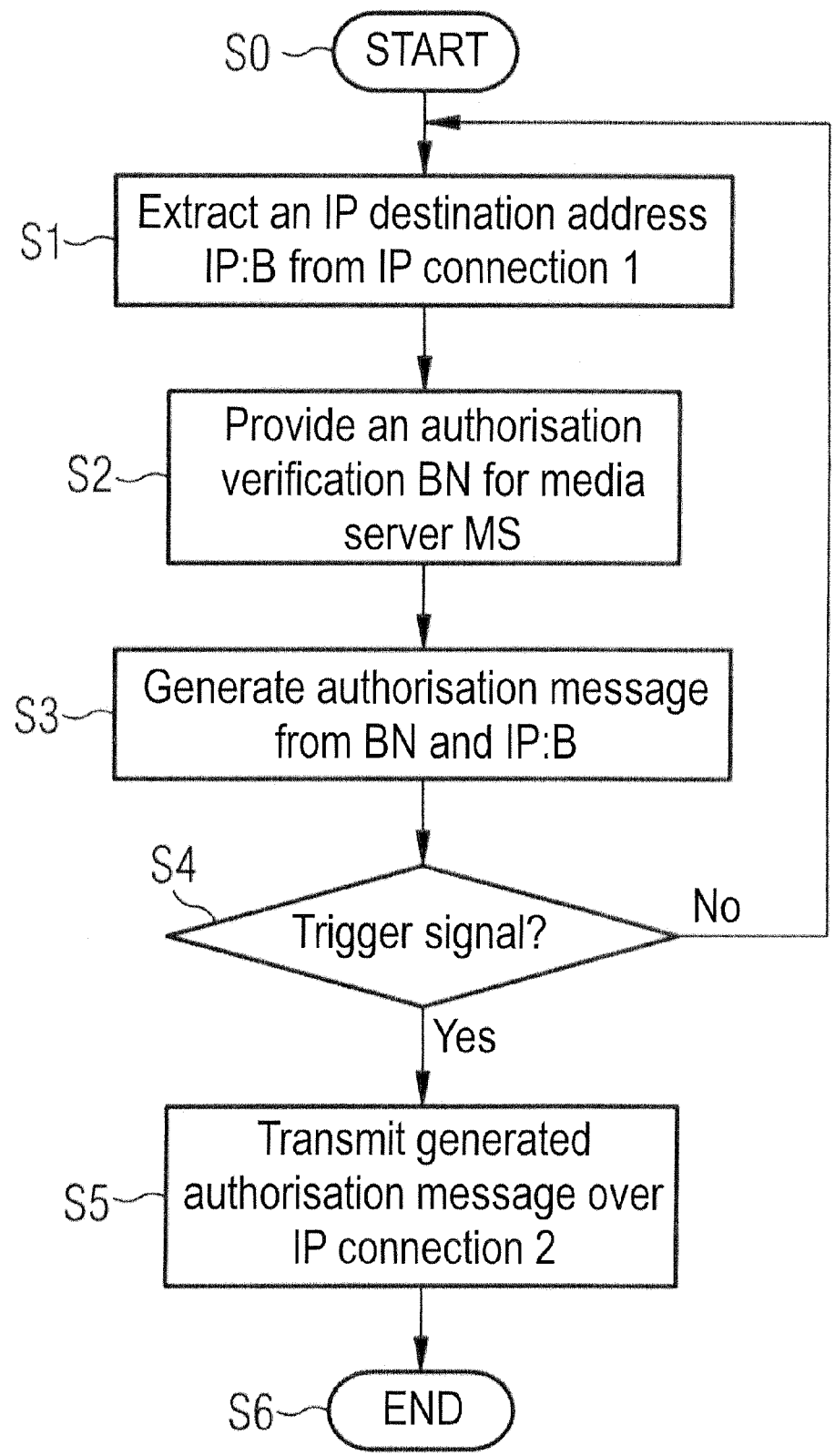

APPARATUS AND METHOD FOR RELEASING LOCAL DATA CONTENTS FOR IP-BASED DATA ACCESS, ASSOCIATED COMMUNICATION SYSTEM, DIGITAL STORAGE MEDIUM, COMPUTER PROGRAM PRODUCT AND COMPUTER PROGRAM

CROSS-REFERENCE TO RELATED APPLICATIONS

This application claims priority to German Patent Application No. 10 2008 053 354.8, filed Oct. 27, 2008, the entire contents of which are incorporated herein by reference.

BACKGROUND

The present invention relates to an apparatus and method for releasing local data contents for an IP-based data access as well as an associated communication system, digital storage medium, computer program product and computer program and particularly an apparatus to and method for realising a simplified release of data contents on a local media server by use of an already existing VoIP connection.

Fixed networks such as analogue or digital fixed networks are increasingly substituted or at least supplemented by packet-switched networks, wherein particularly packet-switched networks according to the Internet Protocol (IP) are used.

In such packet-switched networks in most countries the public IP addresses are only assigned dynamically, i.e. a network node or a so-called gateway at a user side normally is assigned a new public IP address every 24 hours. In order to access to private data contents such as audio, video and/or image data of a providing party or provider the accessing party has to know the public IP address of the provider. However, because it changes daily and is not recognizable immediately the accessing party accessing to the data contents over the packet-switched network is faced with a problem which is not easy to solve.

At present solutions already exist such as DynDNS (Dynamic Domain Name System) which are capable to link such a dynamic IP address with a static name. Herein a disadvantage exists in that this service first has to be configured elaborately and moreover doesn't always work reliably. Particularly after a change of the public IP address it often lasts up to several hours until the static name is linked with the new IP address and is known at the DNS-servers within the packet-switched network such as the internet. If the obstacle occurring in connection with the IP address is overcome the accessing party additionally has to authenticate himself using a user ID and password. Such an authorisation verification consisting for example of a user ID and password has to be reported in advance to the accessing party for example by e-mail.

It is an object of the present invention to provide an apparatus and method for releasing local data contents for an IP-based data access as well as an associated communication system, digital storage medium, computer program product and computer program which enable a simplified access as well as an improved user comfort.

SUMMARY OF THE INVENTION

According to the present invention the above object in terms of the apparatus is achieved by the features of claim 1, in terms of the method by the steps of claim 7, in terms of the communication system by the features of claim 11, in terms of the digital storage medium by the means of claim 12, in terms of the computer program product by the means of claim 13 and in terms of the computer program by the means of claim 14.

According to the present invention the apparatus for releasing local data contents for an IP-based data access comprises a local storage unit for storing local data contents, an evaluation unit for evaluating a first IP connection and extracting an IP destination address, an authorisation verification generating unit for generating an authorisation verification for the data access to the storage unit and an authorisation message generating unit for generating an authorisation message on the basis of the authorisation verification and the extracted IP destination address. A trigger unit then enables triggering a transmission process of the generated authorisation message over a second IP connection which is different from the first IP connection. In this way using an already existing IP connection such as a VoIP connection an authorisation message can be generated and transmitted immediately to the subscriber to which an IP connection is already established. Thus an intuitive allocation of authorisation verifications is possible which enables a simplified data access in packet-switched networks.

Herein the first IP connection is particularly a VoIP connection wherein the actual IP address of the dialog partner is extracted as IP destination address. The authorisation verification, for example, can be the actual IP address of the local storage unit and can include a release information assigned to this storage unit. The authorisation verification further can include a user ID, a password and/or an expiration time for the data access whereby an increased security for the IP-based data access can be ensured.

The release information can for example be a local address and can particularly include a path, folder and/or file name. Thus it is possible to merely release partial sections of a local media server and a local storage unit, respectively, for a data access such that the user comfort is further increased.

The authorisation verification can include a SIP-URI which is assigned as a storage unit. In this way it is possible to realise the access to the media content even after termination of the first IP connection or VoIP connection and an intermediate change of the IP address.

The trigger unit preferably can be implemented outside of the gateways and particularly by software in a mobile part connected to it. In this way particularly DECT-(Digital European Cordless Telecommunication) based telecommunication terminals can be used for triggering the authorisation or release message such that the user acceptance can be improved.

Further an authorisation verification storage unit for storing received authorisation verifications can be provided as well as a media access unit for establishing an IP connection and performing the IP-based data access by use of a received authorisation verification. With such an optional supplement the data access by use of received authorisation messages can be realised immediately.

Herein the apparatus is preferably implemented in a network node or a so-called gateway wherein particularly the local storage unit as well as the trigger unit can also be implemented outside the gateway. In this way systems can be obtained which can be modularly arranged.

In one embodiment the apparatus for releasing local data content is characterised in that the local storage unit is a local media server particularly for storing image, audio and/or video data.

In a further embodiment the apparatus for releasing local data content is characterised in that the evaluation unit evaluates a VoIP connection and extracts the actual IP address of the dialog partner as IP destination address.

In a further embodiment the apparatus is characterised in that the authorisation verification includes a release information associated to the actual IP address of the local storage unit.

In a further embodiment the apparatus is characterised in that the authorisation verification includes a user ID.

In a further embodiment the apparatus is characterised in that the authorisation verification includes a password.

In a further embodiment the apparatus is characterised in that the authorisation verification includes an expiration time for the data access.

In a further embodiment the apparatus is characterised in that the release information includes a local address particularly a path, folder and/or file name.

In a further embodiment the apparatus is characterised in that the authorisation verification includes a SIP-URI which is associated to the local storage unit.

In a further embodiment the apparatus is characterised in that the trigger unit is implemented outside the gateway particularly in a mobile part connected to it and/or that the trigger unit is realised by software.

In terms of the method at first an IP destination address is extracted from a first IP connection and an authorisation verification for the data access to the local data contents is provided. Subsequently based on the authorisation verification and the extracted IP destination address an authorisation message is generated and the authorisation message is transmitted when a trigger signal is present or detected. Thus a user can enable a release for an IP-based data access for his local data contents in an extreme simple and easily operable way.

The thus generated authorisation message can be received further on and at least the authorisation verification can be extracted and in addition the received authorisation verification can be stored. Further an IP-based data access by use of the received and optionally stored authorisation verifications can be performed at the side of the provider of the local data contents.

In a further embodiment of the method the local data contents include image, audio and/or video data.

In a further embodiment of the method the first IP connection is a VoIP connection and as IP destination address the actual IP address of the dialog partner is extracted.

In a further embodiment of the method the authorisation verification includes a release information associated to the actual IP address of the local storage unit.

In a further embodiment of the method the authorisation verification includes a user ID.

In a further embodiment of the method the authorisation verification includes a password.

In a further embodiment of the method the authorisation verification includes an expiration time for the data access.

In a further embodiment of the method the release information includes a local address particularly a path, folder and/or file name.

In a further embodiment of the method the authorisation verification includes a SIP-URI which is associated to the local storage unit.

In a further embodiment of the method the trigger signal is generated by a telecommunication terminal particularly a mobile part.

The invention further relates to a communication system for implementing the above mentioned process steps as well as a digital storage medium comprising electronically readable control signals which can interact with a programmable computer system such that the above mentioned process steps can be executed. The invention further relates to a computer program product comprising a program code stored on a machine readable carrier for executing the above mentioned process steps when the computer product is run on a computer. The invention further relates to a computer program comprising a program code for executing the above mentioned process steps when the program is run on a computer.

Further preferred embodiments of the invention are characterised in further claims.

BRIEF DESCRIPTION OF THE DRAWINGS

In the following the invention is described in detail by means of example embodiments with reference to the drawing; in which:

FIG. 3 shows a simplified view of respective IP messages that can be used according to the present invention; and FIG. 4 shows a simplified flowchart for illustrating process steps of the method according to the present invention.

DETAILED DESCRIPTION

In the following the invention is described with reference to an apparatus and method for releasing local data contents in which an already existing VoIP connection (Voice over IP connection) between a provider of the data contents and an accessing party accessing to the data contents is used to exchange "credentials" or authorisation verifications user-friendly at the touch of a button and thus to enable automatically the access to the data and media contents, respectively. Of course instead of the VoIP connection other connections can also be used as the first IP connection.

The present invention uses the fact that during a VoIP connection the public IP addresses of both parties are known. Thus the providing party or provider can for example by pushing a button at a PC, telephone and/or gateway cause his/her media server or the media server of his/her gateway to establish a parallel second connection for example to the media server of the gateway of the accessing party. Subsequently with aid of a defined protocol a stored or automatically generated "credential" or authorisation verification can be exchanged. This authorisation verification can be stored in the media server of the accessing party. By use of the transmitted information subsequently a new entry (link) pointing to the media contents of the provider can be generated for example in the web interface of the media server of the accessing party. If the accessing party subsequently activates this link the stored authorisation verifications are used for authentication purposes at the side of the provider and its media server, respectively, and after successful authentication the access to the media contents is granted. In this way an IP-based data access can strongly be simplified and particularly realised very user-friendly.

In order to enable the access to the media contents even after termination of a VoIP connection and an intermediate change of the IP address of the provider also the so-called SIP-URI (Session Initiated Protocol Uniform Resource Identifier) of the provider can be transmitted together with the authorisation verification. By use of this URI (Uniform Resource Identifier) the new public IP address can be determined such that a simplified IP-based data access is enabled.

The present invention thus by means of a comfortable method not prone to error allows to grant different users an access to the own or local media server.

Particularly the evaluation of an already existing VoIP connection enables an external communication unit to easily access to the own gateway and own media server, respectively.

Figure 1:
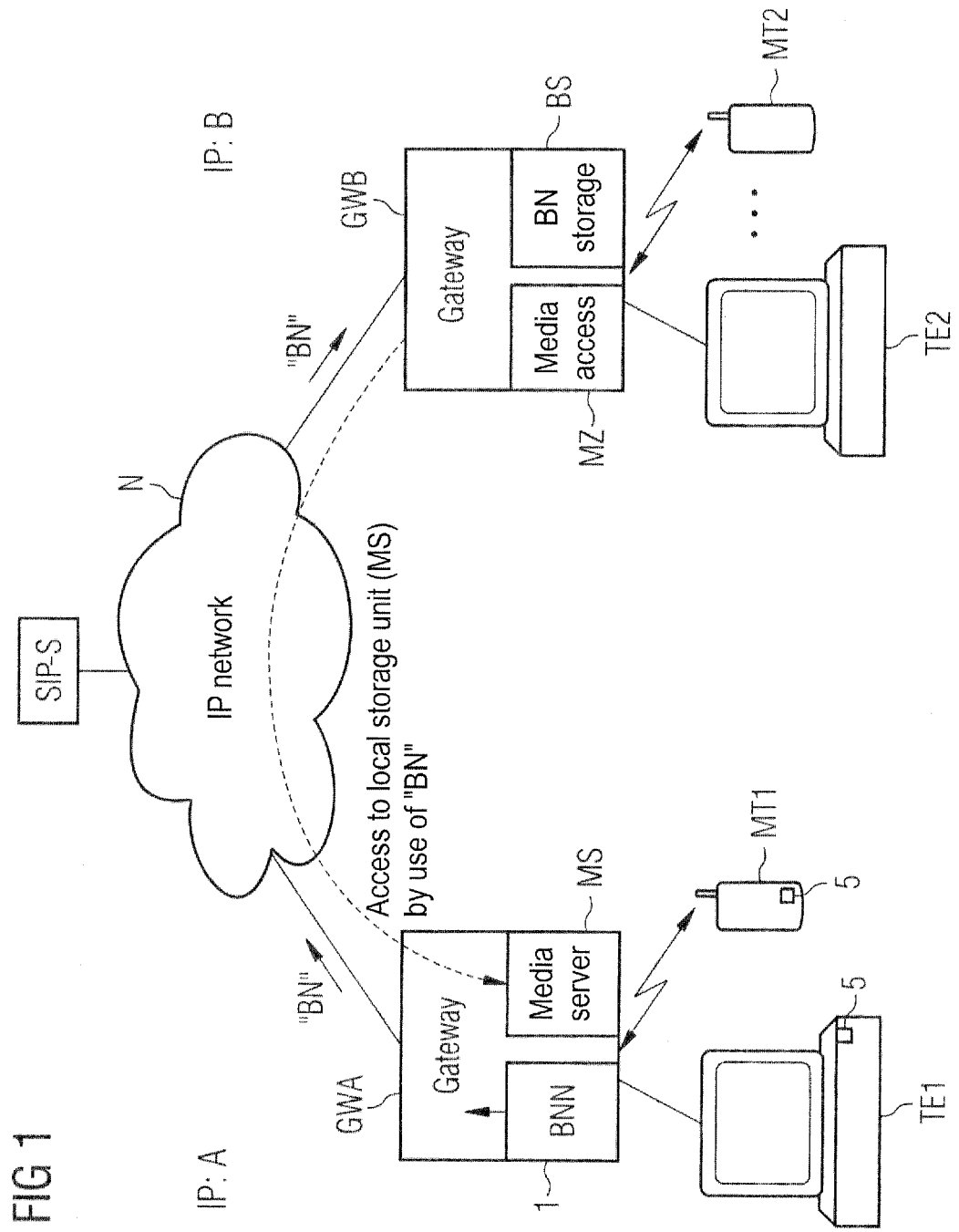
FIG. 1 shows a simplified block diagram of a communication system comprising a gateway in which the present invention can be implemented.

FIG. 1 shows a simplified block diagram of a communication system for illustrating the apparatus and method of the present invention.

According to FIG. 1 a gateway or network node GWA of a provider of local data contents is connected over a packet-switched network N with a gateway and a network node GWB, respectively, of a user accessing to the data contents. The packet-switched network N is particularly an IP (Internet Protocol) network such as the internet. The packet-switched network N further can comprise or be connected to a server unit or a connection or remote access server SIP-S which particularly for realising the initially mentioned VoIP connection supports the realisation of the Session Initiated Protocol (SIP).

According to FIG. 1 the local data contents such as image, audio and/or video data can be stored within a local media server MS which can be implemented as local storage unit in the gateway GWA. The local storage unit and the local media server MS, respectively, of course can also be arranged outside the gateway GWA and can be connected to the gateway GWA and thus to the packet-switched network N solely over a standardised or internal interface (not shown). Further an additional telecommunication terminal such as a PC TE1 or a mobile Telecommunication device or mobile part MT1 can be connected to the gateway GWA of the user providing the local data contents. According to FIG. 1 the gateway GWA and its media server MS, respectively, owns the public IP address "IP:A" which can change for example after 24 hours.

At the access side the corresponding gateway GWB can be arranged, however, only the elements necessary for the data access are shown. Herein an authorisation verification storage unit BS can store the authorisation verifications received from the provider or gateway GWA and a media access unit MZ can enable an IP-based data access to the local data contents of the media server MS in the gateway GWA. Of course also the gateway GWB at the access side can include the function components (not shown) of the gateway GWA and conversely the gateway GWA at the provider side can include the function units (not shown) of the gateway GWB. Again the gateway GWB at the access side can be connected to telecommunication terminals such as a PC TE2 as well as a mobile part MT2, wherein as the mobile parts MT1 and MT2 particularly cordless telephones according to the DECT-standard (Digital European Cordless Telecommunication) or the CAT-iq-standard (Cordless Advanced Technology-internet and quality) can be used.

According to FIG. 1 for example by means of the server SIP-S a VoIP-(Voice over IP) connection from the mobile part MT1 of the provider of data contents to the mobile part MT2 of the accessing party accessing to the data contents can be realised. During this phone call the user of the mobile part MT2 can wish to access to certain local data contents of the user of the mobile part MT2 for example to download images or videos of a holiday spent together. Now the user of the mobile part MT1 and the provider of the local data contents on the media server MS, respectively, for example by use of a trigger unit 5 implemented at the mobile part MT1 can generate a corresponding authorisation verification BN and transmit it over the packet-switched network N to the gateway GWB. This received authorisation verification BN subsequently for example can be stored in the authorisation verification storage unit BS in the gateway GWB of the accessing party. Now by use of the media access unit MZ and by means of the received authorisation verification BN an IP-based data access to the local data contents of the provider stored in the media storage MS can be performed and the data contents released by the user of the mobile part M1 and the gateway GWA, respectively, can be downloaded to the gateway GWB. Finally these data contents for example can be outputted, displayed or otherwise managed at the PC TE2.

According to FIG. 1 the trigger unit 5 for triggering the transmission process for the authorisation verification BN not only can be realised within the mobile part MT1 but also within the PC TE1 and basically also in the gateway GWA (not shown).

Figure 2:
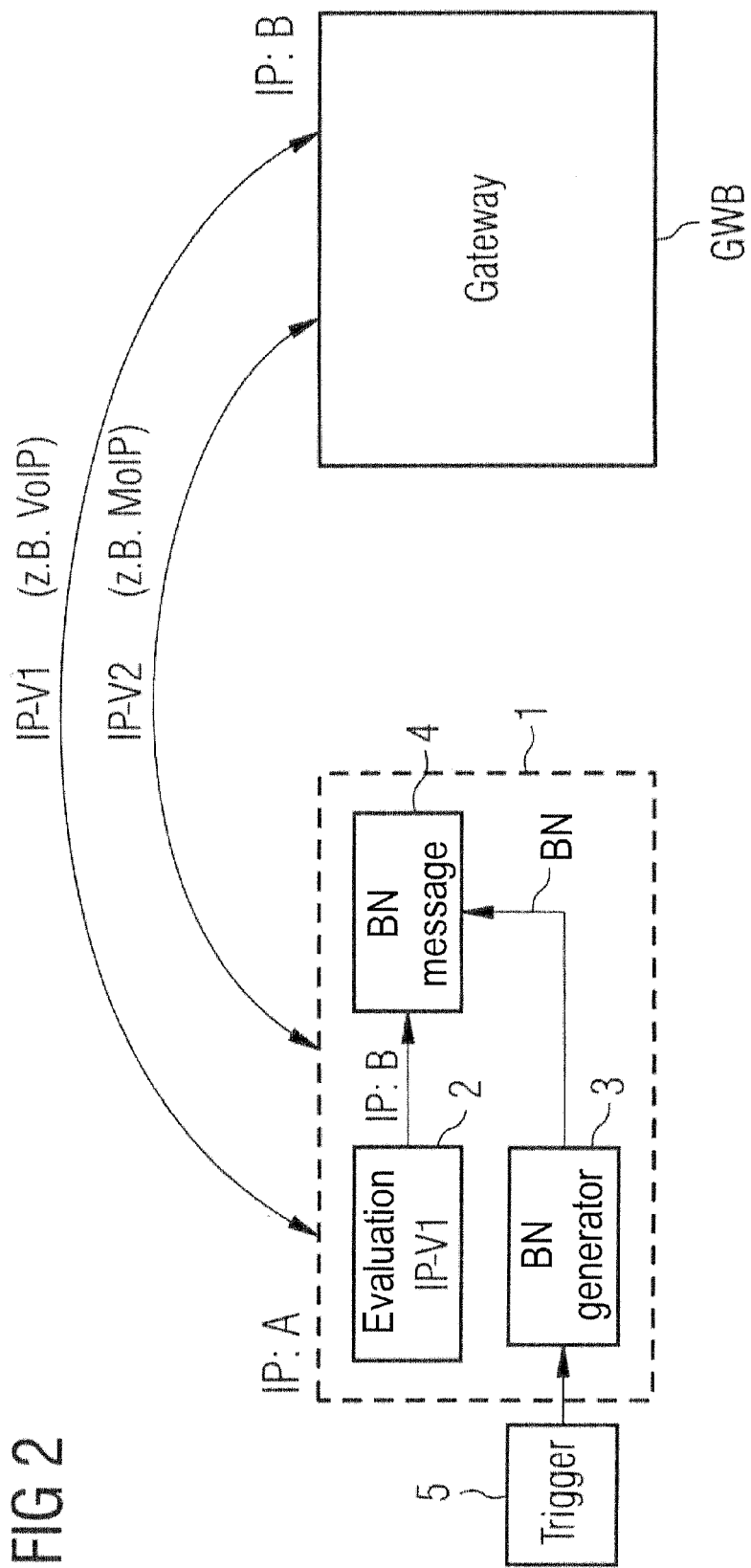
FIG. 2 shows a simplified block diagram of a release device according to the present invention and a corresponding gateway.

FIG. 2 shows a simplified block diagram of a release device 1 as, for example, it can be implemented within the gateway GWA of a provider of local data contents. Of course this release device 1 can also be realised outside the gateway. Further the releasing device 1 can also be realised at the side of the accessing gateway GWB, however, for simplifying the figures this case is not shown. Furthermore the local storage unit for realising the media storage and storing the local data contents is not shown in FIG. 2, because FIG. 2 initially only relates to the pure releasing process.

According to FIG. 2 the releasing means 1 comprises an evaluation unit 2 for evaluating a first IP connection IP-V1 and extracting an IP destination address from the first IP-connection. In the present case the first IP connection can represent a VoIP (voice over IP) connection such that the evaluation unit extracts the actual public IP address IP:B of the dialog partner and the gateway GWB, respectively, as IP destination address from the first IP connection. The releasing device 1 also comprises an authorisation verification generating unit 3 generating an authorisation verification BN for the data access to the local storage unit MS. An authorisation message generating unit 4 generates on the basis of this authorisation verification BN and the IP destination address IP:B extracted from the first IP connection an authorisation message. After actuating the trigger unit 5 this authorisation message is transmitted over a second IP connection IP-V2 which is different from the first IP connection IP-1 to the gateway GWB of the dialog partner. Herein this second IP connection is a pure data connection and can for example be considered as a MoIP-(Media over IP) connection.

Although the trigger unit 5 according to FIG. 2 drives the authorisation verification generating unit 3 it similarly can drive directly the authorisation message generating unit 4 or the evaluation unit 2 or can trigger the transmission process of the generated authorisation message over the second IP connection at any other place. The trigger unit 5 for example can be realised by a simple key which according to FIG. 1 is arranged at the mobile part M1, at the PC TE1 or at the gateway GWA. The trigger unit 5 can particularly be implemented by software such that it can be realised simply as a so-called Soft-Key in the mobile part MT1.

In the following with reference to the IP messages shown in FIG. 3 the operation of the invention is exemplarily described, wherein the IP messages substantially are transmitted over the first and second IP connections IP-V1 and IP-V2 shown in FIG. 2.

According to FIG. 3 at first a VoIP-(Voice over IP) connection can be realised on the first IP connection IP-V1, wherein an IP message transmitted from the gateway GWB as destination address IP:A of the provider of the local data contents further comprises its own public IP address as sender address IP:B and the VoIP-data of the VoIP connection within the payload field. According to the invention the evaluation unit can evaluate the first IP connection IP-V1 and the IP messages received over this connection such that the sender address IP:B is extracted as new IP destination address IP:B for the authorisation message to be transmitted. With reference to FIG. 3 this authorisation message is transmitted over a second IP connection IP-V2 and further includes the sender address IP:A of the provider of the local data contents as well as the authorisation verification BN within the subsequent data fields.

With reference to FIG. 3 the authorisation verification BN transmitted over the second IP connection IP-V2 can include a release information FI, a user ID UID, a password PW, an expiration time T for the data access, etc. In the release information FI can be stored for example a local address and particularly a path, folder and/or file name for the respective data contents. In the simplest case a specification of such a path, folder and/or file name means the complete release of the underlying data contents. Of course explicit release information can also be stored within such a field such as a complete directory of the media server MS. Such release information FI thus can be selectively selected or modified by the user over the PC TE1.

The user ID or User Identification UID as well as the password PW represent the normal contents of an authorisation verification BN which also enable a local user to access to the data contents of the local server MS. Basically this optional information can also be absent, however, in this case a security aspect is deteriorated.

In connection with the expiration time T for the respective data access a period can be defined in which a respective accessing party can temporally access to the data contents indicated in the release information FI. After expiration of such a time the release expires and a data access is no longer possible. This optional expiration time T further increases the security during the release of IP-based data accesses to local data contents. The pure release process is terminated by transmitting this authorisation message.

With reference to FIG. 3 the further IP-messages now illustrate an IP-based data access to the local data contents within the media server MS and the local storage unit, respectively. With reference to FIG. 1 the authorisation verification BN received over the second IP connection IP-V2 as well as the corresponding IP address of the sender and thus the local storage unit now enable subsequent data accesses over the second IP connection IP-V2 or a further IP connection. With reference to FIG. 3 herein the second IP connection IP-V2 is used for the data access, wherein again using the sender address IP:A now this public IP address is used as the destination address for the data access and the authentication data are transmitted by means of the received authorisation verification BN within the data field. In a further not illustrated IP message such an authentication further can be confirmed as successful, however, this is indispensable because basically also other authentication methods are possible in which an explicit confirmation is not made.

After the authentication has been implemented the media contents can be requested from the gateway GWB to the gateway GWA and the associated media server MS, respectively, for example over the second IP connection IP-V2 within a further IP-message. Inasmuch as the authentication has been successful and an expiration time, if any, for the data access has not yet been reached finally the requested media content is transmitted for example over the second IP-connection IP-V2 from the gateway GWA to the accessing gateway GWB.

The accessing party thus obtains an IP-based data access to the local data contents of the provider and its gateway, respectively, in an extreme simple and user-friendly way. Thus a sophisticated configuration of services for managing dynamic IP addresses is no longer necessary. Further a troublesome and error-prone transmission of authorisation verifications for example per e-mail is no longer necessary such that an operation also for technically less experienced users is extremely simplified.

According to the invention the accessing gateway GWB not only can store the received authorisation verifications BN but also can manage them, if necessary, and particularly can be made available to other applications within the gateway or the local network of the gateway GWB. According to the invention furthermore a so-called conference release is supported wherein for realising a so-called conference circuit including more than two subscribers respective authorisation messages including respective authorisation verifications BN are transmitted to all further subscribers and the associated gateways (not shown), respectively. Thus also group releases can be realised.

FIG. 4 shows a simplified flowchart illustrating process steps for releasing local data contents for an IP-based data access according to the present invention.

With reference to FIG. 4 after start in Step S0 at first an IP destination address IP:B is extracted from a first IP connection IP-V1. Further in a step S2 an authorisation verification BN for the IP-based data access to the local data contents within the media sever MS of the provider can be provided. As already described above a release information FI associated to the actual IP address of the local storage unit MS can be included within the authorisation verification BN. The authorisation verification BN further can include a user ID UID, a password PW, an expiration time T for a data access, etc. The release information FI particularly can include information concerning a local address of the local storage unit and particularly a path, folder and/or file name. Basically the steps S1 and S2 also can be mutually changed or executed simultaneously.

With reference to FIG. 4 in a subsequent step S3 an authorisation message is generated on the basis of the authorisation verification BN and the extracted IP destination address IP:B which represents the sender IP address of one subscriber (for example for VoIP). In a step 4 it can be checked whether or not a trigger signal is present or detected. As long as no trigger signal for transmitting the authorisation message for example from the trigger unit 5 is present it can be looped back for example to step 1. As soon as a trigger signal is detected step S4 branches out to step 5 and the authorisation message is now transmitted over a second IP connection IP-V2. Thus the accessing party receives all information necessary for a data access and particularly the actual IP address together with the authorisation verification BN for the local data contents. The process ends in a step 6.

Optionally in not illustrated additional process steps now the authorisation message can be received and at least the authorisation verification can be extracted. Furthermore in a further not illustrated step the received authorisation verification can be stored and managed, if necessary, and made available to further applications. Finally according to a further not illustrated process step the IP-based data access can be executed by use of the received authorisation verification BN and the local data contents can be downloaded over the packet-switched network.

FIG. 4 shows a flowchart illustrating a method and a computer product according to the present invention. However, it is noted that each block or step of the flowchart and respective combinations of blocks within the flowchart can be implemented by computer program instructions. These computer program instructions can be loaded onto a computer or another programmable device to obtain an apparatus, wherein the instructions executed in the computer or other programmable device create means for implementing the operations as represented by the steps of the flowchart. These computer program instructions can also be stored in a digital storage medium such as a DVD, CD or disk which instructs a computer or other programmable device for realising a certain functionality. Moreover the computer program instructions or the program code can for example be downloaded within a telecommunication network to cause other operational steps that are executed on a computer or other programmable device to generate a computer implemented process that enables the execution of the process steps according to FIG. 4.

The invention thus further comprises a digital storage medium including electronically readable control signals that can interact with a computer system such that the process steps according to FIG. 4 can be executed. The invention further relates to a computer program product including a program code stored on a machine readable carrier for executing the process steps according to FIG. 4 when the program is run on a computer. The present invention also relates to a computer program including a program code for executing process steps according to FIG. 4 when the program is run on a computer.

The present invention has been described based on a VoIP connection as the first IP connection. However, the invention is not restricted thereto and similarly includes all further IP connections which are capable of realising an already existing first IP connection.

LIST OF REFERENCE SYMBOLS

1 Release device
2 Evaluation unit
3 Authorisation verification generating unit
4 Authorisation message generating unit
5 Trigger unit
IP-V1 First IP connection
IP-V2 Second IP connection
GWA, GWB Gateway
MS Local storage unit
TE1, TE2 PC
MT1, MT2 Mobile part
MZ Media access unit
BS Authorisation verification storing unit
BN Authorisation verification
N Packet-switched network
SIP-S Remote access server
A Providing party or provider of data contents
B Accessing party accessing to data contents
S1-S6 Process steps

The invention claimed is:

1. Apparatus for releasing local data contents for an IP-based data access, comprising:
   a local storage unit that is a local media server for storing images, audio data and/or video data;
   an evaluation unit for evaluating a first IP connection and extracting an IP destination address;
   an authorisation verification generating unit for generating an authorisation verification for the data access to the local storage unit; an authorisation message generating unit for generating an authorisation message on the basis of the authorisation verification and the extracted IP destination address; and
   a trigger unit for triggering a transmission process of the generated authorisation message over a second IP connection which is different from the first IP connection.

2. Apparatus according to claim 1, characterised in that it is implemented within a gateway.

3. Apparatus according to claim 2, characterised in that the trigger unit is implemented outside the gateway particularly in a mobile part connected therewith.

4. Apparatus according to claim 2, characterised in that the local storage unit is realised outside the gateway.

5. Apparatus according to claim 1, further comprising an authorisation verification storage unit for storing at least one received authorisation verification.

6. Apparatus according to claim 1, further comprising a media access unit for establishing an additional IP connection and performing the IP-based data access by use of a received authorisation verification.

7. Method of releasing local data contents for an IP-based data access, comprising the steps of:
   Extracting an IP destination address from a first IP connection;
   Providing an authorisation verification for the data access to the local data contents;
   Generating an authorisation message on the basis of the authorisation verification and the extracted IP destination address; and
   Transmitting the authorisation message after detection of a trigger signal.

8. Method according to claim 7, further comprising the step of receiving the authorisation message and extracting at least the authorisation verification.

9. Method according to claim 8, further comprising the step of storing the received authorisation verification.

10. Method according to claim 8, further comprising the step of performing the IP-based data access by use of the received authorisation verification.

11. Communication system for performing the method according to claim 7.

* * * * *